(No Model.)
W. BRUMBLE.
CAR BRAKE.
No. 289,970. Patented Dec. 11, 1883.
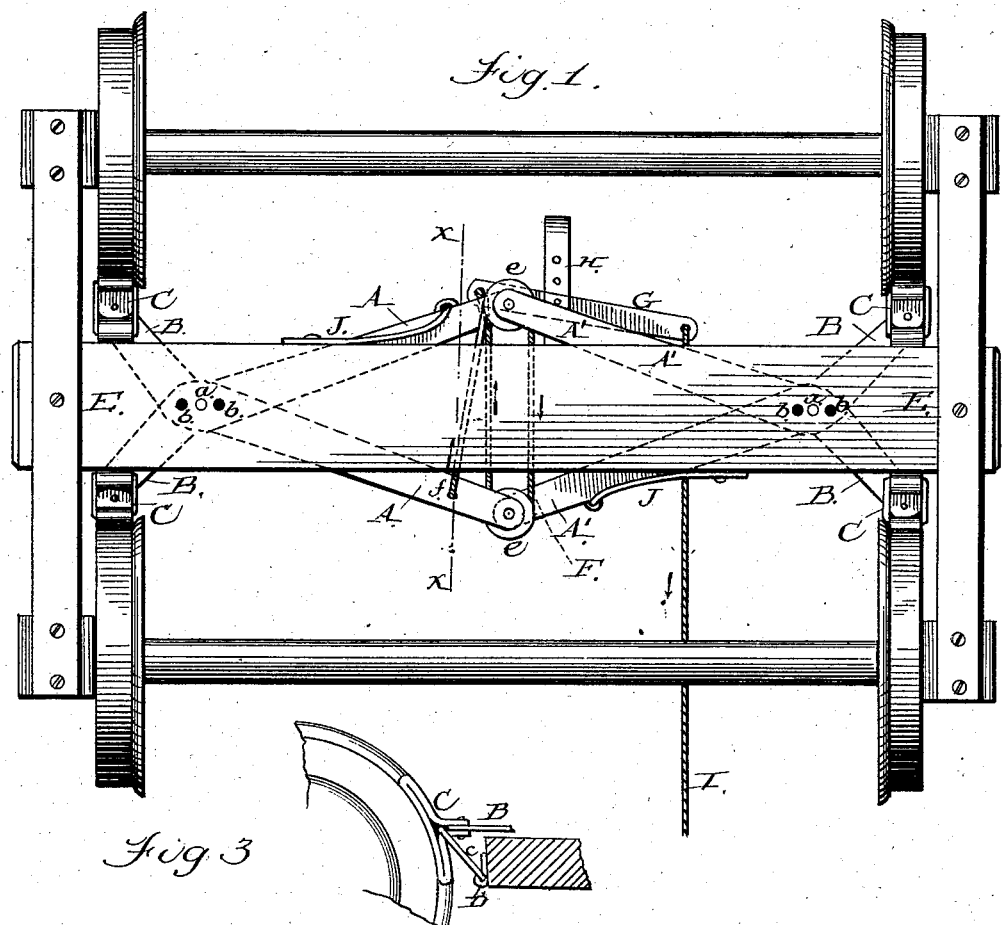

United States Patent Office.

WILLIAM BRUMBLE, OF BALTIMORE, MARYLAND.

CAR-BRAKE.

SPECIFICATION forming part of Letters Patent No. 289,970, dated December 11, 1883.

Application filed October 10, 1883. (No model.)

*To all whom it may concern:*

Be it known that I, WILLIAM BRUMBLE, of Baltimore, State of Maryland, have invented a new and useful Improvement in Brakes for Railway-Cars, of which the following is a full, clear, and exact description, reference being had to the accompanying drawings, making a part of this specification, in which—

Figure 1 is a plan view, showing the brake in operation and the wheels locked. Fig. 2 is a transverse section through $x\ x$ of Fig. 1. Fig. 3 is a detail to be referred to.

The object of my invention is to place a simple and efficient brake between the bolsters of the car, and at the same time have it to operate independently of the bolsters, so as to avoid lumbering up or weakening the bolsters by perforations and bolts of any kind; and it consists of the combination of devices hereinafter explained and claimed.

To enable others skilled in the art to make and use my invention, I will proceed to describe the exact manner in which I have carried it out.

In the drawings, A A' are metal plates, formed with a bend, as shown in Fig. 1. At the bend $a$ these plates are pivoted together, forming a double lever, with the short arms B, carrying on their outer ends the rubber blocks C, for locking the wheels. These blocks may be made and attached to the levers in any of the well-known ways, the outer end of the lever being supported by the stirrup $c$, resting in a suitable eye, D, attached to the side of the lower bolster, E. It is evident that the power of the double levers may be increased or diminished to any degree by simply increasing or diminishing the length of the short arms B of the lever by changing the pivot from $a$ to the holes $b$.

Between the inner ends of the long arms of the levers A A', I pivot the grooved pulley-wheels $e$, which, if desired, may be entirely covered on their upper and lower faces by the inner ends of the lever-plates being made sufficiently broad to embrace them, with a narrow flange fitting over the faces of the wheel, leaving the groove exposed for the chain F. This chain is secured to the lever A at $f$, and then, passing around the pulley-blocks $e$, is secured to the short arm of the lever G, which has its fulcrum in the bifurcated stud H, all as shown in Fig. 1. The long arm of the lever G is connected by the chain I to the brake-shaft. (Not shown.)

The operation of my brake is as follows: By turning the brake-shaft and winding up the chain I, the long arm of the lever G is drawn forward, which causes the short arm to draw on the chain F, which forces the inner ends of the metal plates to approach each other, which forces out the short arms of these plates, carrying the rubber blocks against the wheels, thus combining the action of two powerful levers upon the brake-blocks with comparatively little strain on the brake-shaft.

While I have shown my new brake applied only to a single truck, it is evident that it may be readily applied to both trucks of a car by the use of a simple connecting-bar in a manner well understood by car-builders.

On each side of the upper bolster, E', I attach a spring, J, which, pressing outward, and being attached by any convenient means to one of the plates on each side of the bolster, force the outer ends of the plates apart, when the chain I is released from the brake-shaft, and, necessarily drawing back the short arms B, instantly release the wheels from the operation of the rubber blocks.

Having thus described my invention, what I claim as new, and desire to secure by Letters Patent, is—

1. In a railway-car brake, the bent plates A A', pivoted together at $a$, in combination with rubber blocks C and pulley-blocks $e$, whereby the same is operated, substantially as and for the purpose specified.

2. The bent plates A A', pivoted together at $a$, in combination with the rubber blocks C, pulley-blocks $e$, chain F, springs J, lever G, and chain I, all constructed to operate substantially as and for the purpose set forth.

WM. BRUMBLE.

Witnesses:
 H. B. APPLEWHAITE,
 T. WALTER FOWLER.